Figure 1:
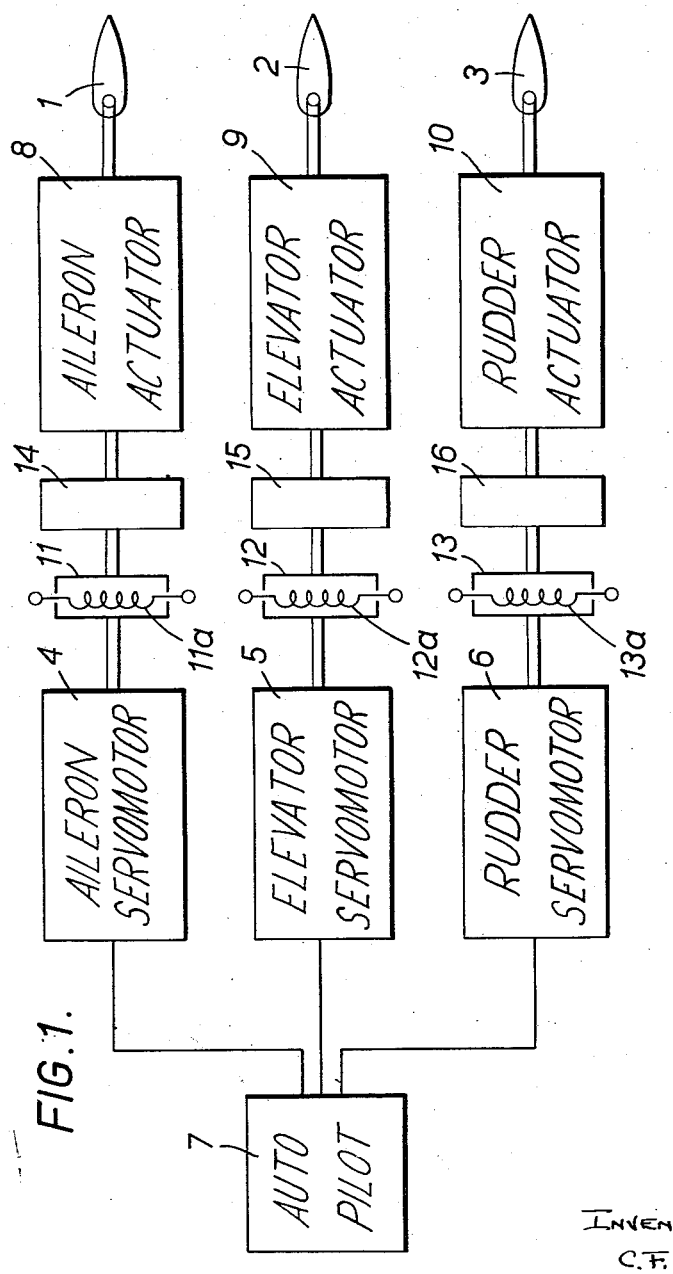

Feb. 25, 1964   C. F. STONE   3,122,344
AUTOMATIC PILOT FOR AIRCRAFT
Filed Nov. 7, 1960   4 Sheets-Sheet 3

INVENTOR:
C. F. STONE
BY: Morrow & Hall
ATTORNEYS.

Feb. 25, 1964   C. F. STONE   3,122,344
AUTOMATIC PILOT FOR AIRCRAFT
Filed Nov. 7, 1960   4 Sheets-Sheet 4

INVENTOR:
C.F. STONE
BY: Moore & Hall
ATTORNEYS.

United States Patent Office 3,122,344
Patented Feb. 25, 1964

3,122,344
AUTOMATIC PILOT FOR AIRCRAFT
Colwyn Francis Stone, Woodmancote, Cheltenham, England, assignor, by mesne assignments, to S. Smith & Sons (England) Ltd., London, England, a corporation of England
Filed Nov. 7, 1960, Ser. No. 67,622
12 Claims. (Cl. 244—77)

The present invention relates to automatic pilots for aircraft. In these it is usual to provide a manually-actuable cut out member (for example a push button) which can be readily operated by the person, this will usually be the pilot, in over-all charge of the aircraft, to prevent the automatic pilot from continuing to control the aircraft. This may be effected for example by disengaging clutches in the drives from servo motors forming the outputs of the automatic pilot to the corresponding aircraft control surfaces. A simple spring loaded cut out member, such as has been used previously, has two disadvantages. Firstly it is difficult to choose a spring loading which is strong enough to avoid accidental operation but will nevertheless permit rapid and positive operation in an emergency and secondly the pilot cannot sense by feeling the cut out member the state of the automatic pilot.

According to the present invention an automatic pilot for an aircraft is provided with a manually actuable cut out member operable to prevent the automatic pilot from continuing to control the aircraft and means for exerting a restraint on the cut out member against manual actuation thereof, said means being controlled in dependence upon the condition of the automatic pilot so that the restraint, when the member is in its un-actuated condition, has a first relatively large value when the automatic pilot is effective to control the aircraft and a second relatively small value when it is not. Said means for exerting a restraint on the cut out member may conveniently comprise a weak spring and an armature and an electrically energisable winding arranged in co-operating relationship to apply a relatively large component of restraint (additional to that provided by the spring) to the cut out member when the winding is energised. The armature may for example be integral with or mounted on a member which moves when the cut out member is actuated, the coil and the armature being arranged so that when the coil is energised, the magnetic force acting on the armature, when the member is in its un-actuated position, opposes any such movement of said member.

The cut out member may for example be a push button or a manually operable lever and is preferably mounted on the pilot's control handle provided for manual control of the aircraft.

Figure 2:
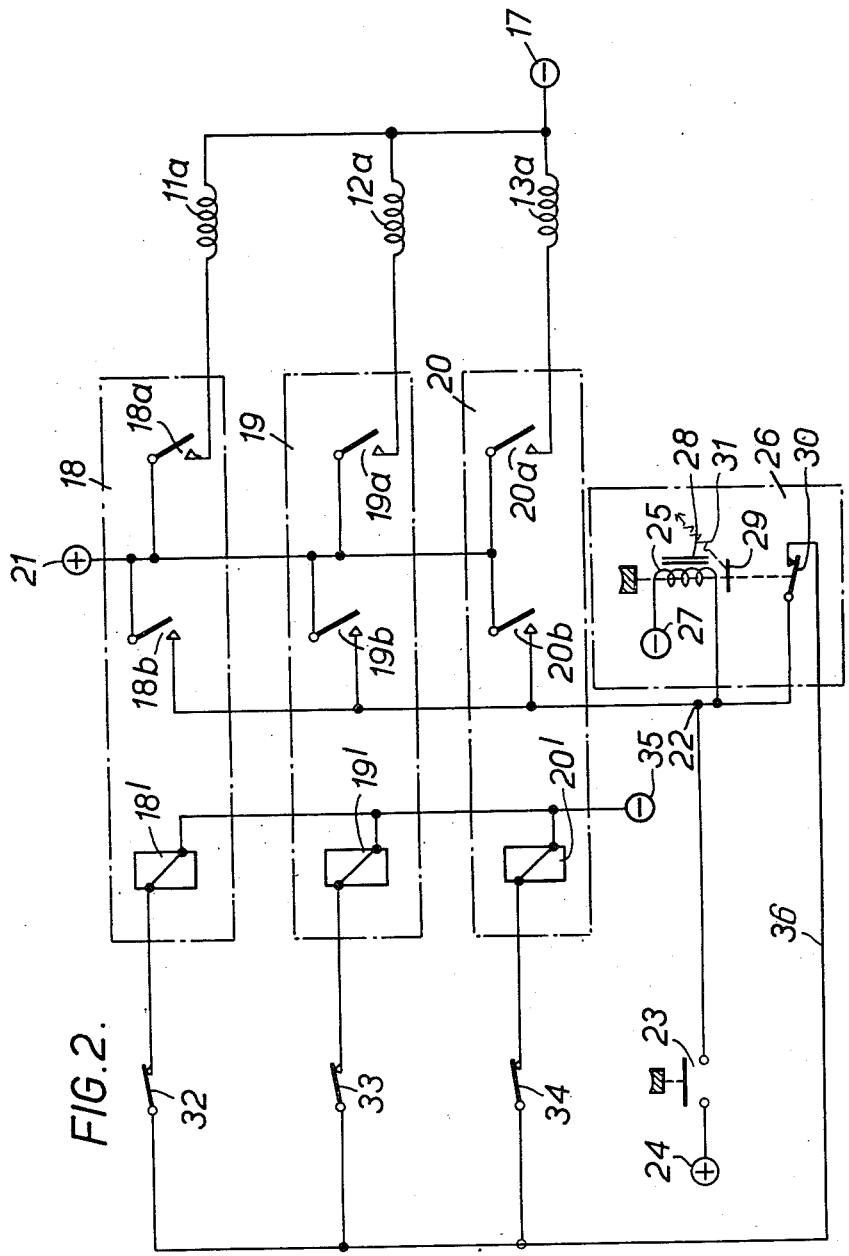
Figure 3:
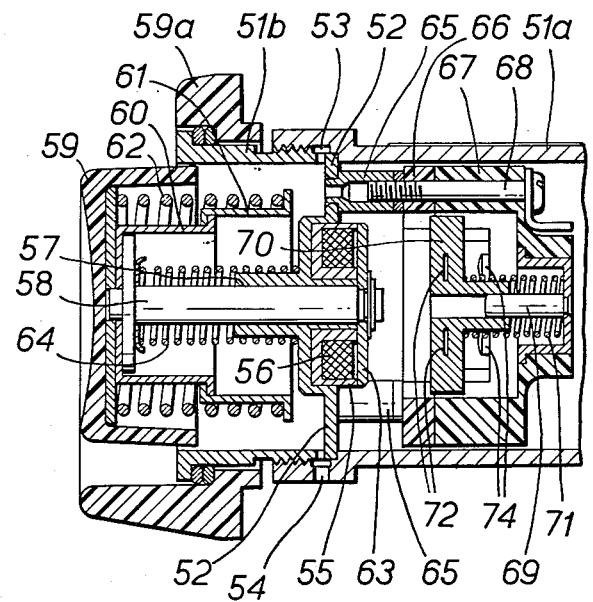
Figure 4:
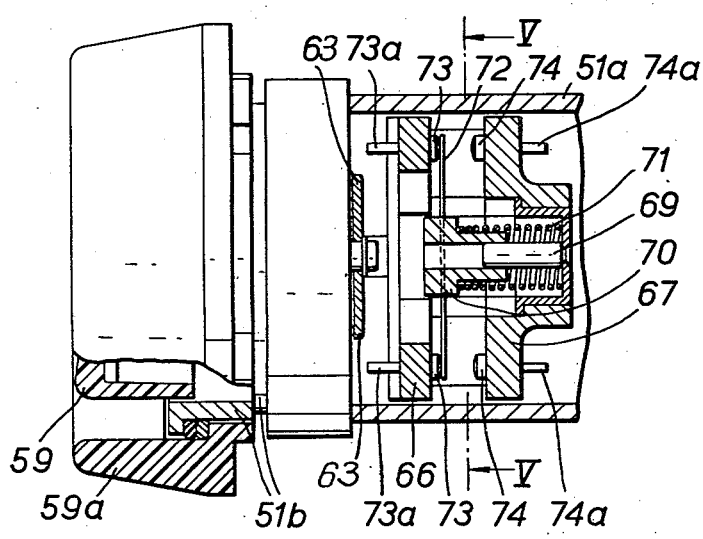
Figure 5:
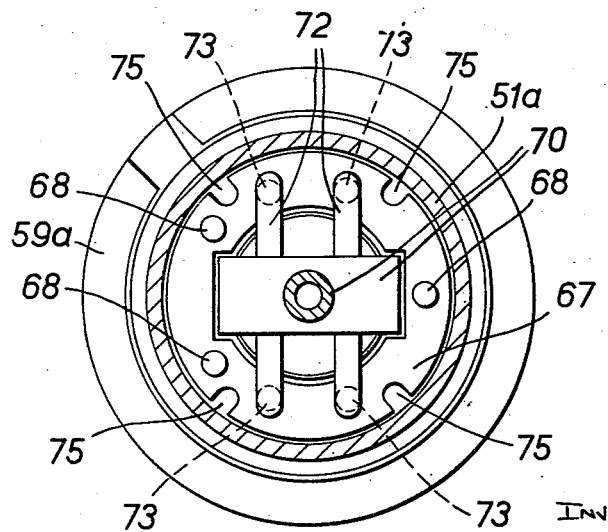

One example of an automatic pilot according to the present invention will now be described with reference to the accompanying drawings in which:

FIGURE 1 shows a block schematic diagram of the automatic pilot and the aircraft's control surfaces, FIGURE 2 shows a diagram of the relevant parts of the automatic pilot switching circuits, and FIGURES 3–5 show various sectional views of a cut out push button mechanism for use in an automatic pilot according to the invention.

Referring now to FIGURE 1 of the drawings, there is shown a block schematic diagram of a conventional automatic pilot for controlling an aircraft about all three of its axes. The aircraft is assumed to have ailerons 1, elevators 2 and a rudder 3 all of which are indicated only schematically in FIGURE 1 and may take any suitable form. The automatic pilot includes in known manner signal sources such as gyroscopes and pendulum monitors together with servo amplifier channels to which signals from the sources are applied and which provide electrical output signals for actuating an aileron servo motor 4, an elevator servo motor 5 and a rudder servo motor 6. The signal sources may also include for example such items as radio beam receivers and radio altimeters. In FIGURE 1 the signal sources and amplifier channels are for convenience represented by the single block 7 labelled auto pilot.

The servo motors 4–6 are coupled to respective control surface actuators 8–10, which may for example be conventional hydraulic actuators, this coupling being effected through electro-magnetic clutch 11–13, when their coils 11a–13a are energised, and torque limiting devices 14–16 to the input members of the actuators 8–10. The output members of the actuators 8–10 are coupled to the ailerons 1, the elevators 2 and the rudder 3 respectively. It will be understood that this is only a general description of one example of an automatic pilot to which the present invention is applicable and that the invention is equally applicable to other forms of automatic pilot. In particular where, for safety, each channel comprises a plurality of identical sub-channels, there may be a plurality of clutches in each channel, one for each sub-channel.

The parts of the automatic pilot circuits for controlling the energisation of the clutch coils 11a–13a are shown in FIGURE 2 of the drawings. Each of the coils 11a–13a is connected between a terminal 17 which is connected as indicated to the negative side of a suitable D.C. voltage source, and one side of a normally open contact 18a, 19a or 20a respectively incorporated in the corresponding one of three electro-magnetic relays 18–20. These relays 18–20 have windings 18'–20' and also second normally open contacts 18b–20b. The other sides of the contacts 18a–20a are connected in common to a terminal 21 which is connected to the positive side of the D.C. voltage source. The terminal 21 is also connected to one side of each of the contacts 18b–20b, the other sides of which are connected together to a common terminal 22.

There are in addition various other connections to the terminal 22 namely a connection to one side of a normally open push button operated contact 23 which constitutes the engage switch for the automatic pilot, the other side of the contact 23 being connected to a terminal 24 which is connected to the positive side of the D.C. voltage source. Terminal 22 is also connected to one side of a coil 25 forming part of a manually actuable cut out mechanism 26 for the automatic pilot. This is shown in FIGURE 2, by way of example, as being a push button operated mechanism but it is to be understood that the operating member may take any other convenient form, for example a lever or a rotary knob suitably coupled mechanically to the remainder of the mechanism. The other side of the coil 25 is connected to a terminal 27 which is connected to the negative side of the D.C. voltage source. The coil 25 is provided with a magnetic core 28 and co-operates with an armature 29 which is mounted for movement with the push button together with a contact member 30 of a normally closed switch contact. When the coil 25 is energised it exerts a force on the armature 29 tending to oppose motion of the push button in the direction such as to open the contact 30. In addition, as indicated only schematically in FIGURE 2, there is provided a weak spring 31, also exerting a force on the armature opposing motion of the push button in the sense to open the contact 30. The force exerted on the armature 29 by the coil 25, when energised with the armature 29 in the position corresponding to the normal un-actuated position of the button, is considerably greater than that exerted by the spring 31.

The contact 30 is connected between the terminal 22 and a lead 36 which is connected through three parallel circuits, each including one of three normally closed switches 32–34 and one of the relay windings 18′–20′, to a terminal 35 which is itself connected to the negative side of the D.C. voltage source.

It will be seen that in operation with a suitable D.C. voltage source connected to the various terminals as set out above, closure of the contact 23 by operation of the engage button completes a circuit from terminal 24 through contact 23 to terminal 22 and thence through contact 30 lead 36 and each of the switches 32–34 and relay windings 18′–20′ to terminal 35, thus energising the windings 18′–20′. Energisation of the windings 18′–20′ causes closure of the contacts 18a–20a and 18b–20b. Closure of contacts 18b–20b completes holding circuits for the relays 18–20 from terminal 21 through contacts 18b–20b in parallel to terminal 22, thus providing a circuit for energising the windings 18′–20′ after release of the push button contact 23. Closure of the contacts 18a–20a completes circuits for energising the three clutch coils 11a–13a. As soon as the push button contact 23 is closed a circuit is also completed from terminal 24 to terminal 27 through the contact 23, which circuit energises the coil 25 of the cut out mechanism 26. The winding 25 remains energised after release of the contact 23 through the holding circuits for the relays 18–20 provided by the contacts 18b–20b. Thus as long as any one of the clutch coils 11a–13a are energised the coil 25 is energised and there is a relatively large magnetic force acting on the armature 29 to oppose operation of the push button included in the cut out mechanism 26. When the auto pilot is switched off by opening all of the channel switches 32–34 (these switches may include other contacts which are not shown in the drawing and which switch off various other parts of the circuits), the relay windings 18′–20′ are de-energised and all the contacts open breaking the energising circuits for the clutch coils 11a–13a and the coil 25 in the cut out mechanism. In this condition motion of the push button of the cut out mechanism is opposed only by the force exerted by the spring 31. The pilot is therefore able to tell if all channels of the auto pilot are disengaged by a light "feel" of the cut out button. When wishing to operate the cut out button in an emergency, there is initially a relatively large resistance to operation of the button but this decreases rapidly as the armature 29 moves away from the coil 25.

The circuit shown in FIGURE 2 is a simple one and it will be apreciated that it may be elaborated as required in individual circumstances. For example the switches 32–34 may each be replaced by a number of switches in series each of which is opened on the occurrence of some fault condition in the channel concerned. One such switch may for example be a switch operated by the torque limiting devices 14–16 of FIGURE 1, the switch contact being open when the torque transmitted by the device exerts a pre-determined amount.

The construction of an example of a manually actuable push button mechanism which may be employed as a cut out button in an automatic pilot according to the present invention, either that described with reference to FIGURES 1 and 2 or any other, is shown in FIGURES 3–5 of the accompanying drawings, FIGURE 3 showing a section through the longitudinal axis of the mechanism, FIGURE 4 a view of the mechanism which is a part section of the plane through the longitudinal axis at right angles to the plane of FIGURE 3 and FIGURE 5 a section at the plane V—V in FIGURE 4.

Referring now to these figures, it will be seen that the button has a generally cylindrical casing formed by two parts one 51a and the other 51b which are screwed together and support a member 52, the periphery of which is clamped between an internal shoulder on casing part 51a and the end of casing part 51b which is castellated to permit the passage of air into an annular passage 53 which communicates with the exterior of the casing through a number of radial holes 54 of which one only appears in FIGURE 3. The right hand end of casing part 51a is shown broken off in FIGURES 3 and 4, being joined to a base member which is provided with means for securing the mechanism to the control column of an aircraft and also passages for electrical leads. These items may take any suitable form and will not be described here.

The member 52 supports the core 55 and coil 56 of an electromagnet and has an internal cylindrical surface 57 which acts as a journal bearing for a shaft 58.

The shaft 58 carries at its left hand end (the terms left and right will be used in this description to denote the relative positions of various parts as shown in FIGURE 3) a push button 59 and a pair of annular sleeves 60 and 61 which, when the button 59 is not depressed are held extended in the positions shown in FIGURE 3 by means of a spring 62. The spring 62 is such that it requires an axial force of 3–4 lbs. weight in order to compress it. A shield 59a for the button 59 is mounted on the casing part 51b.

At its right hand end the shaft 58 carries an armature 63 which, as shown in FIGURE 3, is held against the pole pieces of the magnetic core 55 when the button 59 is in its undepressed position. A second spring 64 which is much lighter than the spring 62 and requires an axial force of only about ½ lb. weight to compress it maintains the armature 63 in contact with the core 55 as long as the button 59 remains undepressed. (The force may for example lie in the range ¼ to 1 lb. weight.)

The member 52 also supports a switch contact assembly on three pillars 65, symmetrically arranged around the longitudinal axis of the mechanism, being riveted to the member 52 for this purpose. The pillars 65 support a pair of electrically insulating members 66 and 67 which are secured to the pillars 65 by bolts 68. The member 67 supports an axial shaft 69 on which is mounted an electrically insulating bush 70 which can move axially with respect to the shaft 69. A light spring 71 tends to force the bush 70 to the left as shown in FIGURE 3. The bush 70 carries two metallic moving contact fingers 72 which in the positions shown in FIGURES 3 and 4 each bridge a pair of fixed metal contacts 73 carried by the member 66. Movement of the bush 70 to the right against the action of the spring 71 will break the circuits between the pairs of contacts 73 and eventually bring the moving fingers 72 to a position in which they complete circuits between two other pairs of fixed contacts 74 carried by the member 67. Electrical leads (not shown in the drawings) are soldered to the pins 73a and 74a which are integral with the contacts 73 and 74 and pass out of the casing to the right through its base structure (also not shown). Grooves 75 are provided in the outer surfaces of the members 66 and 67 for the leads from pins 74a as shown in FIGURE 5.

The coil 56 of the electro-magnet is included in a circuit such as that described above with reference to FIGURES 1 and 2 of the drawings such that the coil 56 (which corresponds to the coil 25 of FIGURE 2) is energised whenever the automatic pilot is switched on and in control of the control surfaces of the aircraft. The electromagnet and the armature 63 are such that, with the coil 56 energised there is an axial pull on the armature 63 towards the core 55 of some 7–8 lbs. weight. (This force may for example lie in the range 6 to 10 lbs. weight.) Thus if manual pressure is exerted on the button 59 whilst the coil 56 is energised there will initially be a force of some 8 lbs. resisting inwards axial movement of the button 59 which will accordingly be held firmly in position. If on the other hand the coil 56 is not energised, the only axial force initially resisting inwards motion of the button 59 is that exerted by the spring 64 which is only of the order of ½ lb. weight. By exerting light pressure on the button 59 it is therefore possible for a human pilot to ascertain immediately whether the automatic pilot is engaged or not.

If the automatic pilot is engaged and the human pilot wishes to disengage it by operation of the cut out button, he can do so by exerting an inwards force in excess of 8 lbs on the button 59. When he does this, the armature 63 will move away from the core 55 and after a small axial movement, the attraction exerted on it by the core 55 even with the coil 56 energised, will be very small. The button 59 can then move inwards against the slight force exerted by the spring 64 until the sleeve 61 comes into contact with the surface of the member 52. Further inwards movement of the button 59 will cause telescoping of the sleeves 60 and 61 against the force exerted by the spring 62 which is of the order of 4 lbs. This further movement will eventually bring the right hand end of the shaft 58 into contact with the left hand end face of the bush 70 which is then moved to the right against the action of the spring 71 until the moving contact fingers 72 first leave contact with the fixed contacts 73 and finally come into contact with the fixed contacts 74.

In the circuit shown in FIGURE 2 only one contact is shown in the cut out mechanism, that being a normally closed contact which is opened on operating the mechanism. This may be constituted by one pair of the fixed contacts 73 and one of the moving fingers 72. The other switching contacts available in the mechanism of FIGURES 3–5 may be employed as required for example, for operating indicators or other circuits.

In another form of manually operable mechanism for use in an automatic pilot according to the present invention, there is provided on the pilot's control handle for controlling the aircraft manually a lever which lies conveniently beside a part of the handle which is normally gripped by the pilot. The lever can pivot about one end, on being pulled towards the part of the handle which it lies beside, against the pull exerted by a flexible cable. The cable is connected to a mechanism generally similar to that described with reference to FIGURES 3–5 which mechanism exerts a pull of the cable of about ½ lb. weight by means of a spring unless the coil of an electromagnet the armature of which is connected to the cable, is energised in which case the pull is about 10 lbs. weight. The pilot can thus readily test the condition of the automatic pilot by the feel of the lever. If, with the coil energised, i.e. with the automatic pilot switched on, the pilot wishes to operate the switch controlled by the lever in order to put the automatic pilot out of action, a firm pull on the lever can overcome the magnetic force on the armature and actuate the associated switch mechanism.

It will be appreciated that mechanisms other than those described may be used in automatic pilots according to the present invention and that all that is required of such mechanisms is that there shall be means for exerting on the manually operable member a restraint against manual operation, the restraint having a relatively large value when the automatic pilot is switched on and controlling the aircraft and a relatively small value when the automatic pilot is switched off. In the two mechanisms described above the relatively large value has been obtained by means of an electro-magnet which is energised when the automatic pilot is switched on and exerts a suitable attraction on an armature which is mechanically coupled to the cut out member. It is not however essential that this restraint should be obtained directly by means of an electro-magnetic force although this is a convenient arrangement.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. An automatic pilot for an aircraft having first and second conditions of operation in which it is respectively effective and ineffective to control the aircraft, and being provided with first switching means for switching the automatic pilot between its first and second conditions, a manually actuable cut out member having a single position in which it remains, unless actuated, irrespective of the condition of the automatic pilot, means responsive to actuation of said member when the automatic pilot is in its first condition of operation for switching the automatic pilot to its second condition of operation, second switching means separate from said first switching means and operable for continuously exerting a first restraint on the cut out member resisting actuation thereof, means for exerting a second larger restraint on the cut out member resisting actuation thereof in addition to the first restraint, and control means operable in response to the condition of the automatic pilot for rendering said second restraint exerting means effective only when the automatic pilot is in its first condition of operation.

2. An automatic pilot according to claim 1 in which said first restraint exerting means is a weak spring.

3. An automatic pilot according to claim 2 in which the restraint exerted by said spring lies in the range ¼ to 1 lb. weight.

4. An automatic pilot according to claim 2 in which said second restraint exerting means comprises an armature and an electrically energizable winding arranged in co-operating relationship to apply a relatively large component of restraint (additional to that provided by the spring) to the cut out member when the winding is energized.

5. An automatic pilot according to claim 4 in which the armature is rigidly joined to a member which is itself coupled mechanically to the cut out member to move in a predetermined manner when the cut out member is actuated, the coil and the armature being arranged so that when the coil is energized, the magnetic force acting on the armature, when the member is in its un-actuated position, opposes any such movement of said member.

6. An automatic pilot for an aircraft having first and second conditions of operation in which it is respectively effective and ineffective to control the aircraft, having a manually actuable cut out member, means responsive to actuation of said member when the automatic pilot is in its first condition of operation for switching the automatic pilot to its second condition of operation, means for continuously exerting a first restraint on the cut out member resisting actuation thereof, means for exerting a second larger restraint on the cut out member resisting actuation thereof in addition to the first restraint, and control means operable in response to the condition of the automatic pilot for rendering said second restraint exerting means effective only when the automatic pilot is in its first condition of operation, said first restraint means being a weak spring capable of exerting an equivalent force within the range of one quarter to a pound weight, said second restraint exerting means comprising an armature having an electrically energizable winding arranged in cooperating relationship to apply a relatively large component of restraint in addition to that provided by said spring to said cut out member when said winding is energized, said cut out member being a push button and means operably connecting said push button and said armature.

7. An automatic pilot for an aircraft having control surfaces for directing its flight comprising at least one servo channel for controlling the position of a control surface of the aircraft, the servo channel including an output motor and a linkage for coupling the motor to the control surface to move the control surface in accordance with the movements of the motor, an electro-magnetically operable clutch in said linkage, the clutch having first and second conditions of operation in which the linkage is respectively effective and ineffective to move the control surface in accordance with the motor movements, a manually actuable cut out member for the automatic pilot having a single position in which it remains, unless actuated, irrespective of the condition of the automatic pilot, an electric circuit for energization of the clutch, first switching means for opening and closing said circuit to change the automatic pilot between its first and second conditions, second switching means separate from said first switching means and responsive to actuation of the cut out member to break said electric circuit, means for continuously exerting a first restraint on the cut out member resisting actuation thereof, means for exerting a second larger restraint on the cut out member resisting actuation thereof in addition to the first restraint, and control means operative to render said second restraint exerting means effective only when the circuit is closed and the clutch is in its first condition of operation.

8. An automatic pilot according to claim 7 in which said first restraint exerting means is a weak spring.

9. An automatic pilot according to claim 8 in which the restraint exerted by said spring lies in the range ¼ to 1 lb. weight.

10. An automatic pilot according to claim 7 in which said second restraint exerting means comprises an armature and an electrically energizable winding arranged in co-operating relationship to apply a relatively large component of restraint (additional to that provided by the spring) to the cut out member when the winding is energized.

11. An automatic pilot according to claim 10 in which the armature is rigidly joined to a member which is itself coupled mechanically to the cut out member to move in a predetermined manner when the cut out member is actuated, the coil and the armature being arranged so that when the coil is energized, the magnetic force acting on the armature, when the member is in its unactuated position, opposes any such movement of said member.

12. An automatic pilot according to claim 7 in which said first switching means includes an electro-magnetic relay, a normally open contact of which is included in said circuit, said control means including a second contact of said relay which operates to render the second restraint exerting means effective when the relay is energized.

References Cited in the file of this patent
UNITED STATES PATENTS

| | | |
|---|---|---|
| 2,663,519 | Rossire | Dec. 22, 1953 |
| 2,674,423 | Noxon | Apr. 6, 1954 |